United States Patent [19]

Sawamura

[11] 4,212,516
[45] Jul. 15, 1980

[54] SCANNER WITH MULTIPLE OPTICAL FIBRES

[75] Inventor: Ichiro Sawamura, Hachioji, Japan

[73] Assignee: Olympus Optical Company Ltd., Tokyo, Japan

[21] Appl. No.: 883,882

[22] Filed: Mar. 6, 1978

[30] Foreign Application Priority Data

Mar. 14, 1977 [JP] Japan .................. 52-29595

[51] Int. Cl.$^2$ .............................. G02B 5/14
[52] U.S. Cl. .................. 350/96.24; 250/227
[58] Field of Search .................. 350/96.24, 96.25; 250/227, 233

[56] References Cited

U.S. PATENT DOCUMENTS

| | | | |
|---|---|---|---|
| 3,036,153 | 5/1962 | Day | 350/96.24 |
| 3,104,324 | 9/1963 | Rabinow | 350/96.25 |
| 3,255,357 | 6/1966 | Kapany et al. | 250/227 |
| 3,401,232 | 9/1968 | Goldhammer et al. | 350/96.24 X |
| 3,800,149 | 3/1974 | Lang | 250/227 |
| 3,836,958 | 9/1974 | McMurtry | 250/227 |
| 3,937,580 | 2/1976 | Kasdan | 250/550 |

FOREIGN PATENT DOCUMENTS 44-15614 7/1969 Japan ..................... 350/96.25

Primary Examiner—Rolf G. Hille
Attorney, Agent, or Firm—Weinstein & Sutton

[57] ABSTRACT

A scanner comprises a first array of a multitude of optical fibres having one of their end faces aligned along a rectilinear line and having their other end face disposed on a circle, a second array of a multitude of optical fibres having one of their end faces disposed in opposing relationship with the said other end face of the optical fibres of the first array and having their other end faces arranged together at a single location, a scanning disc rotatably disposed between the opposing end faces of the first and second arrays and having a single signal transmission aperture and a plurality of timing apertures formed therein, a single phototube disposed in opposing relationship with the collected end faces of the optical fibres of the second array, and a channel detector disposed adjacent to the timing apertures. The scanner achieves an optical scanning of a specimen to be examined.

8 Claims, 4 Drawing Figures

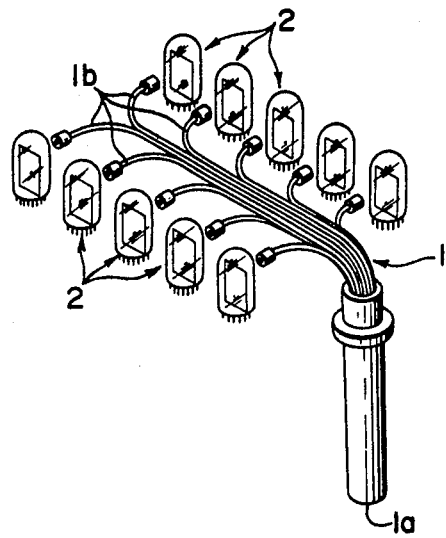
FIG. I(A) PRIOR ART
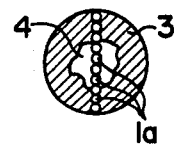
FIG. I(B) PRIOR ART
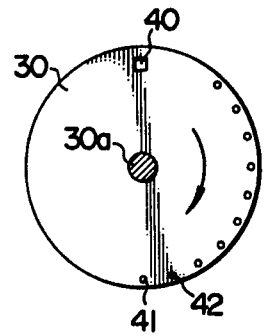
FIG. 3
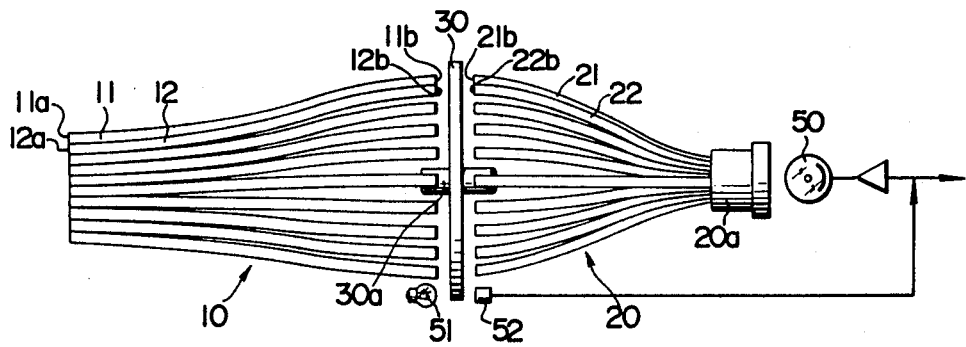
FIG. 2

SCANNER WITH MULTIPLE OPTICAL FIBRES

BACKGROUND OF THE INVENTION

The invention relates to a scanner with multiple optical fibres, and more particularly to an improvement of a multi-sensor which achieves an optical scanning operation at a high rate of a specimen to be examined under a microscope or the like.

The requirements imposed on a screening apparatus for recording and processing data obtained from a multitude of specimens are the automation capability and the high speed of processing of data from the specimens. To satisfy such requirements, there has been proposed a multi-sensor formed by glass fibres and which utilizes a single spot to scan the field of sight of a microscope. Referring to FIG. 1A, there is shown a given number of glass fibres 1, which are ten in number in the example shown, which have one of their end faces 1a disposed in alignment along a line and secured in place and having their other end faces 1b disposed in opposing relationship with separate detectors 2, each of which comprise a photoelectron multiplier tube. The end faces 1a are located in a field of sight 3 defined by an image enlarging and focussing plane of an objective, as shown in FIG. 1B, while a scanning stage carrying a specimen 4 thereon is moved at a rate of 1 μm/second, for example, to perform a scanning of the specimen. The information signal detected by the sensor is fed to the photoelectron multiplier tubes located at the other end of the fibres for electronic processing of the signal of each channel defined by the individual fibres. The described multi-sensor is capable of screening the full field of sight of a microscope in one step and is adapted for automation to improve the processing speed of the specimen. However, the sensor requires the use of a number of photomultiplier tubes, and also requires a multiplexer to process multi-channel outputs from the specimen.

SUMMARY OF THE INVENTION

It is an object of the invention to provide a scanner with multiple optical fibres which avoids the shortcomings of the described multi-sensor while enabling multi-channel outputs to be processed by a single phototube.

In accordance with the invention, a first array of optical fibres have one of their end faces disposed in a circular array so as to be scanned by a rotatable scanning disc having a single signal transmission aperture. The scanned output is transmitted through one end of a number of optical fibres of a second array which are disposed on a circle. The other ends of the optical fibres of the second array are collected together at a single location so as to feed the scanned output to a single phototube in a sequential manner. As a consequence, the need for a separate multiplexer is avoided, enabling an inexpensive scanner to be provided.

The scanning disc may be formed with a plurality of timing apertures, which are effective to produce a channel discrimination signal to assure a proper sequencing of the scanned output from the specimen. In this manner, the disadvantage of the prior art is completely eliminated with the scanner of the invention.

BRIEF DESCRIPTION OF THE DRAWINGS

FIG. 1A is a perspective view of a conventional multi-sensor;

FIG. 1B is a schematic cross section illustrating the scanning of a specimen;

FIG. 2 is a plan view of the scanner according to one embodiment of the invention; and FIG. 3 is a front view of the scanning disc shown in FIG. 2.

DESCRIPTION OF PREFERRED EMBODIMENT

Referring to FIG. 2, there is shown a first array of optical fibres 10 which comprises a multitude of optical glass fibres 11, 12 . . . , which have their end faces 11a, 12a . . . aligned along a rectilinear line in the manner shown by the arrangement of end faces 1a of FIG. 1B. At this end, the glass fibres are fixed together to maintain the alignment. The end faces 11a, 12a . . . are located in an image enlarging and focussing plane of an objective of a microscope. The fibres 11, 12 . . . are separated from each other and have their other end faces 11b, 12b . . . disposed at equal intervals about a circle of a suitable radius.

FIG. 2 shows a second array 20 of optical glass fibres 21, 22 . . . , which are equal in number to the number glass fibres 11, 12 . . . of the first array. One of the ends 21b, 22b . . . of the fibres of the second array are disposed on a circle in opposing relationship with the other end 11b, 12b . . . of corresponding glass fibres 11, 12 of the first array 10, while their other ends are collected or bundled together at a single location to be held together by a fastening member 20a.

A scanning disc 30 which is rotatably mounted on a support shaft 30a is disposed in the clearance between the opposing end faces 11b, 12b . . . and 21b, 22b . . . of the first and the second array 10, 20. As shown in FIG. 3, the disc 30 is peripherally formed with a single signal transmission aperture 40 and a plurality of timing apertures 41, 42 . . . . The signal transmission aperture 40 is formed in the disc 30 at a radius which corresponds to that of the circle on which the end faces 11b, 12b . . . of the glass fibres 11, 12 . . . are located so as to pass the output signal from such end face to the associated end face 21b, 22b . . . of the fibres 21, 22 . . . of the second array in a sequential manner as the disc rotates. The purpose of the timing apertures 41, 42 is to enable a channel discrimination between the individual optical fibres 11, 12 . . . and 21, 22 . . . . As shown in FIG. 2, a light source 51 and a light receiving element 52 are disposed on opposite sides of the disc in order to pass light therebetween through one of the timing apertures, thus forming a channel discriminator.

A single phototube 50 is located in opposing relationship with the collected end faces of the optical fibres of the second array 20 which are held together by the fastening member 20a. The phototube 50 comprises a photo-multiplier tube, which receives image information output from the collected end in a sequential manner for photoelectric conversion thereof into a corresponding electrical signal. The electrical signal is combined with an output from the element 52.

In operation, the scanning disc 30 is rotated at a high rate, whereupon input image information which is focussed on the end faces 11a, 12a . . . and conveyed to the other end faces 11b, 12b . . . passes through the signal transmission aperture 40 in a sequential manner to be applied from the end faces 11b, 12b and thence to the other ends . . . of the optical fibres 21, 22 of the second array 20. The information input thus transmitted is immediately detected by the phototube 50 at the collected end of the fibres 21, 22 . . . .

When the signal is transmitted from the first array 10 to the second array 20, the light from the source 51 sequentially passes through the timing apertures 41, 42 and is received by the element 52 which provides a converted electrical timing signal to be used in combination with the image information output from the phototube 50, thus enabling a channel discrimination among the fibres 11, 12 . . . . In this manner, the outputs from a number of channels can be processed by the single phototube in accordance with the invention.

What is claimed is:

1. A scanner with multiple optical fibres, comprising a first array of a multitude of optical fibres having one of their end faces aligned along a rectilinear line and having their other end faces separated from each other and disposed at equal intervals about a circle, said one end faces being adapted to have an image of a specimen to be examined focussed thereon; a second array of a multitude of optical fibres each having one of their end faces disposed in opposing relationship with the said other end faces of the fibres of the first array and having their other end faces collected together at a single location; a scanning disc rotatably disposed between the opposing end faces of the optical fibres of the first and the second array and having formed therein a single signal transmission aperture for passing an image information signal from said other end of an optical fibre of the first array to said one end of an associated optical fibre of the second array in a sequential manner and also having formed therein a plurality of timing apertures equal in number to the number of optical fibres in said first and second array, respectively and aperture sensing means including a light source and a light receiving element disposed on opposite sides of said disc so as to pass light through said timing apertures in a sequential manner to identify the particular channel through which the signal transmission between the first and the second array occurs; a single phototube disposed in opposing relationship with the collected end faces of the second array for receiving the information signals from all of the optical fibres in said second array.

2. A scanner according to claim 1 in which the phototube comprises a photo-multiplier tube.

3. A scanner comprising a first group of optical fibres having their input ends arranged along a first predetermined line in closely spaced fashion and having their output ends arranged at spaced intervals along a second predetermined line;

a second group of optical fibres having their input ends each arranged in close proximity to an output end of an associated one of the optical fibres in said first group;

a single signal collector; the output ends of all of the optical fibres in said second group being arranged to direct signals from their output ends upon said collector;

sequential enabling means arranged between the output ends of said first optical fibre group and the input ends of said second optical fibre group for sequentially enabling an information signal appearing at the output end of each optical fibre in the first group to be passed to the input end of an optical fibre in the second group whereby the information signals at the output ends of optical fibres in sais second group are sequentially collected by said signal collector.

4. The scanner of claim 3 wherein said first predetermined line comprises a rectilinear line, wherein said second predetermined line comprises a circular line, and wherein said sequential enabling means comprises a disc rotatably disposed between the output ends of said first optical fibre group and the input ends of said second optical fibre group, said disc being rotatably mounted for rotation about an axis aligned with the center of said circular line and having a single signal transmission aperature for passing in a sequential manner information signals appearing at the output end of said optical fibres of said first group to the input ends of said optical fibres of said second group.

5. The scanner of claim 4 further including a plurality of timing apertures and aperture sensing means for identifying the particular optical fibres of said first and second groups through which the information signals are passed.

6. The scanner of claim 5 wherein said plurality of timing apertures is equal in number to the number of optical fibres in said first group, and wherein said aperture sensing means includes a light source and a light receiving element disposed on opposite sides of said disc for passing light through said timing apertures in a sequential manner to identify the particular optical fibres through which the information signals pass.

7. The scanner of claim 5 wherein said aperture sensing means further includes signal generating means for generating an electrical signal in response to light passing from said light source through one of said timing apertures to said light receiving element, and means for combining said electrical signal with the output of said single signal collector.

8. The scanner of claim 3 wherein said single signal collector comprises a photomultiplier tube.

* * * * *